United States Patent
Shen

(10) Patent No.: US 10,075,695 B2
(45) Date of Patent: Sep. 11, 2018

(54) INFORMATION PROCESSING METHOD AND DEVICE

(71) Applicant: Lenovo (Beijing) Co., Ltd., Beijing (CN)

(72) Inventor: Hao Shen, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 82 days.

(21) Appl. No.: 14/559,067

(22) Filed: Dec. 3, 2014

(65) Prior Publication Data

US 2016/0005142 A1 Jan. 7, 2016

(30) Foreign Application Priority Data

Jul. 3, 2014 (CN) .......................... 2014 1 0315444

(51) Int. Cl.
*G06T 7/73* (2017.01)
*H04N 13/02* (2006.01)
(Continued)

(52) U.S. Cl.
CPC .......... *H04N 13/02* (2013.01); *G06K 9/6228* (2013.01); *G06K 9/6255* (2013.01); *G06T 7/73* (2017.01); *G06K 2009/4666* (2013.01)

(58) Field of Classification Search
CPC . G06K 9/00281; G01C 21/32; G01C 21/3647
See application file for complete search history.

(56) References Cited

U.S. PATENT DOCUMENTS 7,624,123 B2 * 11/2009 Bandas ............. G06F 17/30256
8,543,904 B1 9/2013 Karls
(Continued)

FOREIGN PATENT DOCUMENTS

CN 101196930 6/2008
CN 101739397 6/2010
(Continued)

OTHER PUBLICATIONS

First Office Action dated Feb. 5, 2018 (12 pages including English translation) from corresponding Chinese priority Application No. 201410315444.4.

*Primary Examiner* — Jitesh Patel
(74) *Attorney, Agent, or Firm* — Brinks Gilson & Lione; John C. Freeman

(57) ABSTRACT

An information processing method and device are disclosed. The information processing method is applied to an information processing device in which a 3D map and a spatial topological structure management-based feature library created in advance for a certain environment are contained, and different users in the certain environment can determine their location. The method includes acquiring a first image taken by a first user; extracting one or more first feature points in the first image to obtain first feature descriptors; obtaining 3D locations of the first feature points based on 3D location of the first user, the first image, and the feature library; determining feature descriptors to be updated based on 3D location of the first user, the 3D locations of the first feature points, the first feature descriptors corresponding to the first feature points, and existing feature descriptors in the feature library; and updating the feature library.

6 Claims, 6 Drawing Sheets

(51) Int. Cl.
  *G06K 9/62* (2006.01)
  *G06K 9/46* (2006.01)

(56) References Cited

U.S. PATENT DOCUMENTS

| | | | |
|---|---|---|---|
| 8,861,785 B2 | 10/2014 | Oi | |
| 2004/0264763 A1* | 12/2004 | Mas | G01C 23/00 382/154 |
| 2005/0238198 A1* | 10/2005 | Brown | G06K 9/4609 382/103 |
| 2005/0286767 A1* | 12/2005 | Hager | G06K 9/00208 382/190 |
| 2006/0268406 A1* | 11/2006 | McMahon | G06F 17/30241 359/485.01 |
| 2007/0222864 A1* | 9/2007 | Hiraga | G06T 7/2073 348/208.4 |
| 2008/0209010 A1* | 8/2008 | Zitnick, III | G06F 17/30244 709/219 |
| 2008/0260274 A1* | 10/2008 | Winder | G06K 9/4671 382/248 |
| 2009/0055020 A1* | 2/2009 | Jeong | G05D 1/0246 700/251 |
| 2009/0070031 A1* | 3/2009 | Ginsberg | G01C 21/32 701/532 |
| 2009/0148068 A1* | 6/2009 | Woodbeck | G06F 17/30256 382/305 |
| 2010/0070125 A1* | 3/2010 | Lee | G06T 7/0042 701/28 |
| 2010/0085358 A1* | 4/2010 | Wegbreit | G06T 19/20 345/420 |
| 2010/0223299 A1* | 9/2010 | Yun, II | G06K 9/00201 707/803 |
| 2010/0257252 A1* | 10/2010 | Dougherty | G06K 9/00979 709/217 |
| 2010/0310154 A1* | 12/2010 | Barrois | G01B 11/245 382/154 |
| 2010/0321490 A1* | 12/2010 | Chen | G01C 11/00 348/118 |
| 2010/0329508 A1* | 12/2010 | Chen | G06K 9/00697 382/103 |
| 2011/0038545 A1* | 2/2011 | Bober | G06K 9/4633 382/190 |
| 2011/0153206 A1* | 6/2011 | Kotaba | G01C 21/00 701/532 |
| 2011/0255781 A1* | 10/2011 | Hamsici | G06K 9/4671 382/170 |
| 2011/0299782 A1* | 12/2011 | Hamsici | G06K 9/4671 382/195 |
| 2011/0313779 A1* | 12/2011 | Herzog | G06Q 10/10 705/1.1 |
| 2012/0011119 A1* | 1/2012 | Baheti | G06F 17/30247 707/737 |
| 2012/0011142 A1* | 1/2012 | Baheti | G06K 9/4671 707/769 |
| 2012/0027290 A1* | 2/2012 | Baheti | G06K 9/6857 382/154 |
| 2012/0050285 A1* | 3/2012 | Kannenberg | G01C 21/32 345/419 |
| 2012/0114178 A1* | 5/2012 | Platonov | G01C 21/3602 382/103 |
| 2012/0195506 A1* | 8/2012 | Kim | G06Q 10/00 382/195 |
| 2012/0315992 A1* | 12/2012 | Gerson | A63F 13/12 463/42 |
| 2013/0004079 A1* | 1/2013 | Yamada | G06K 9/4642 382/190 |
| 2013/0158859 A1* | 6/2013 | Sathish | G06T 11/20 701/409 |
| 2013/0170716 A1 | 7/2013 | Lee | |
| 2013/0243250 A1* | 9/2013 | France | G01C 15/00 382/103 |
| 2013/0322763 A1* | 12/2013 | Heu | G06T 7/30 382/195 |
| 2014/0005933 A1* | 1/2014 | Fong | G05D 1/0274 701/447 |
| 2014/0019615 A1 | 1/2014 | Jennings | |
| 2014/0293016 A1* | 10/2014 | Benhimane | G06T 7/0028 348/50 |

FOREIGN PATENT DOCUMENTS

| | | |
|---|---|---|
| CN | 101996420 | 3/2011 |
| CN | 102521366 | 6/2012 |
| CN | 102750541 | 10/2012 |

\* cited by examiner

INFORMATION PROCESSING METHOD AND DEVICE

This application claims priority to Chinese patent application No. 201410315444.4 filed on Jul. 3, 2014, the entire contents of which are incorporated herein by reference.

BACKGROUND

The disclosure is related to an information processing method and device, more particularly, to an information processing method and device capable of updating the database adaptively in auto-localization technology.

For an unknown environment, a 3D map may be created in advance by Simultaneous Localization and Mapping (SLAM) technology, and so on. In the environment wherein map has been created, a mobile terminal device, e.g., a robot, matches the feature points in an image taken by itself with the feature points of a global map, such that localization information itself is obtained.

The localization algorithms oriented for the average people has the characteristics of mass usage for population and broad extent for scenario, and the feature library required for localization has an issue of degraded performance for localization as the time or scenario is varied. It is very important, therefore, to update the feature library, including an addition of new feature points and a deletion of vanished feature points. How to update the localization feature library adaptively by using feedback information from users has a crucial effect for the stability and generality of the products.

SUMMARY

It is desirable to provide a method and device for updating a localization feature library adaptively in view of the situation as described above. That is, the issue to be solved in the application is that how to determine which of the features in the feature library are required to be updated and/or deleted.

In accordance with an aspect of the disclosure, there is provided an information processing method applied to one information processing device in which a 3D map and a spatial topological structure management-based feature library created in advance for a certain environment are contained, and different users in the certain environment are able to determine their locations by themselves in accordance with an image taken by them and the feature library, the method including the steps of acquiring a first image taken by a first user; extracting one or more first feature points in the first image to obtain the first feature descriptors for characterizing the first feature points; obtaining the 3D locations of the first feature points based on the 3D location of the first user, the first image, and the feature library; determining the feature descriptors to be updated based on the 3D location of the first user, the 3D locations of the first feature points, the first feature descriptors corresponding to the first feature points, and the existing feature descriptors in the feature library; and updating the feature library based on the feature descriptors to be updated.

Preferably, in the information processing method in accordance with the disclosure, the step of determining feature descriptors to be updated comprises the steps of selecting one of the first feature points in the first image; determining one or more minimum spatial nodes crossed by a line between the selected first feature point and the location of the first user; judging whether any feature descriptors of the feature library are contained within the minimum spatial node; determining all of the feature descriptors contained within the minimum spatial node as the feature descriptors to be deleted if the judgment is positive.

Preferably, in the information processing method in accordance with the embodiment of the disclosure, the step of determining feature descriptors to be updated further includes the steps of determining respective first feature descriptors in the first image as feature descriptors to be added; acquiring a plurality of strength information of the feature descriptors to be added; removing the feature descriptors of which the plurality of strength information are less than a first threshold among the feature descriptors to be added.

Preferably, in the information processing method in accordance with the embodiment of the disclosure, the step of determining feature descriptors to be updated further includes the steps of determining respective first feature descriptors in the first image as feature descriptors to be added; calculating a similarity degree between the feature descriptor to be added and the feature descriptor in the feature library at the corresponding minimum spatial node, wherein they are considered to be similar if the similarity degree is greater than a second threshold; among the feature descriptors to be added, removing the feature descriptors which are considered similar to feature descriptors in the feature library.

Preferably, the information processing method in accordance with the embodiment of the disclosure may further include the steps of acquiring a second image taken by a second user; extracting second feature points in the second image to obtain second feature descriptors for characterizing the second feature points; obtaining 3D locations of the second feature points based on a location of the second user and the second image; determining feature descriptors to be updated based on 3D location of the second user, the 3D locations of the second feature points, the feature descriptors corresponding to the second feature points, and existing feature descriptors in the feature library; judging whether feature descriptors to be updated at the same minimum spatial node are obtained in the first and second images; calculating a correlation degree between the feature descriptors to be updated in the first and second images at the same minimum spatial node if the judgment is positive, and determining the feature descriptors to be updated in the first and second images as final feature descriptors to be updated only when the correlation degree is greater than a third threshold; determining them not as the final feature descriptors to be updated if the judgment is negative.

In accordance with another aspect of the disclosure, there is provided an information processing device for creating in advance a 3D map and a spatial topological structure management-based feature library for a certain environment, such that the different users in the certain environment are able to determine their locations in accordance with images taken by them and the feature library, the device comprising: a storage unit for storing the 3D map and the feature library; a communication unit for acquiring a first image taken by a first user; an extraction unit for extracting one or more first feature points in the first image to obtain first feature descriptors for characterizing the first feature points; a 3D location determination unit for obtaining the 3D locations of the first feature points based on location of the first user, the first image, and the feature library; an update unit for determining the feature descriptors to be updated based on 3D location of the first user, the 3D locations of the first feature points, the first feature descriptors corresponding to the first feature points, and existing feature descriptors in the feature library, and for updating the feature library based on the feature descriptors to be updated.

Preferably, in the information processing device in accordance with the embodiment of the disclosure, the update unit comprises: a selection unit for selecting one of the first feature points in the first image; a deletion unit for determining one or more minimum spatial nodes crossed by the line between the first feature points and the location of the first user, and for judging whether any feature descriptor in the feature library is contained within the minimum spatial nodes; determining all of the feature descriptors contained within the minimum spatial nodes as the feature descriptors to be deleted, if the judgment is positive.

Preferably, in the information processing device in accordance with the embodiment of the disclosure, the update unit further comprises: an addition unit for determining respective first feature descriptors in the first image as feature descriptors to be added; a strength information acquisition unit for acquiring a strength information of the feature descriptors to be added; a filter unit for removing the feature descriptors of which the plurality of strength information are less than the first threshold among the feature descriptors to be added.

Preferably, in the information processing device in accordance with the embodiment of the disclosure, the update unit further comprises: an addition unit for determining respective first feature descriptors in the first image as feature descriptors to be added; a similarity degree calculation unit for calculating a similarity degree between the feature descriptor to be added and a feature point in the feature library at the corresponding minimum spatial node, wherein they are considered to be similar if the similarity degree is greater than the second threshold; a filter unit for removing the feature descriptors with the similar feature descriptors in the feature library.

Preferably, in the information processing device in accordance with the embodiment of the disclosure, a second image taken by a second user is acquired by the communication unit; one or more second feature points in the second image are extracted by the extraction unit to obtain the second feature descriptors for characterizing the second feature points; 3D locations of the second feature points are obtained by the 3D location determination unit based on location of the second user, the second image, and the feature library; the feature descriptors to be updated are determined by the update unit based on the 3D location of the second user, the 3D locations of the second feature points, the second feature descriptors corresponding to the second feature points, and the existing feature descriptors in the feature library, and a judgment on which whether the feature descriptors to be updated at the same minimum spatial node are obtained in the first and second images is made by the update unit; calculating a correlation degree between the feature descriptors to be updated in the first second images at the same minimum spatial node if the judgment is positive, and determining the feature descriptors to be updated in the first second images as final feature descriptors to be updated only when the correlation degree is greater than a third threshold; determining them not as the final feature descriptors to be updated if the judgment is negative.

With the information processing method and device in accordance with the embodiment of the disclosure, a feature library update may be conducted and the features to be deleted and added may be determined in conjunction with a crowdsourcing mode without any repeated mapping, such that it is possible that the degraded performance of the localization database due to the variation of time, scenario, and users is avoided effectively with a minimal cost.

DETAILED DESCRIPTION

Respective preferred implementations of the disclosure will be described with reference to the drawings as below. The description with reference to the drawings is provided below to facilitate an appreciation of the exemplary implementations of the disclosure defined by the claims and the equivalences thereof. Various specific details are included therein for an assistance of the appreciation, but are considered to be exemplary merely. Therefore, it is to be recognized by those skilled in the art that various changes and modifications may be made to the implementations described herein without any departure of the scope and spirit of the disclosure. In addition, a detailed description of the common known functions and structures in the art will be omitted for a sake of a more clear and simply specification.

An illustration for a scenario to which the disclosure is applied will be made firstly before the description of the information processing method and device in accordance with the embodiment of the disclosure. A so-called crowdsourcing mode refers to a practice mode in which the work tasks performed by the employees in the past are outsourced to an uncertain, and generally, a giant, public network by one company or institute in a free and voluntary form. The crowdsourcing tasks are generally undertaken personally, and if, however, a task requiring many persons to handle in cooperation is involved, it may be also occur in a form of individual production dependent on open source. In the disclosure based on the crowdsourcing mode, the localization algorithms are oriented to the public, i.e., an uncertain amount of users. That is, the uncertain amount of users may use a feature library for localization, and update the feature library based on feedback information, e.g., space location information, a feature information, and a match feature relevant to the feature library, from the users, at the same time, in order to improve the stability and generality of the feature library.

Next, the specific procedure of the information processing method in accordance with the embodiment of the disclosure will be described with reference to FIG. 1. The illustrated information processing method is applied to one information processing device, e.g., a sever device, in which a 3D map and a spatial topological structure management-based feature library created in advance for a certain environment are contained, and different users in the certain environment are able to determine their locations in accordance with the images taken by themselves and the feature library.

Figure 1:
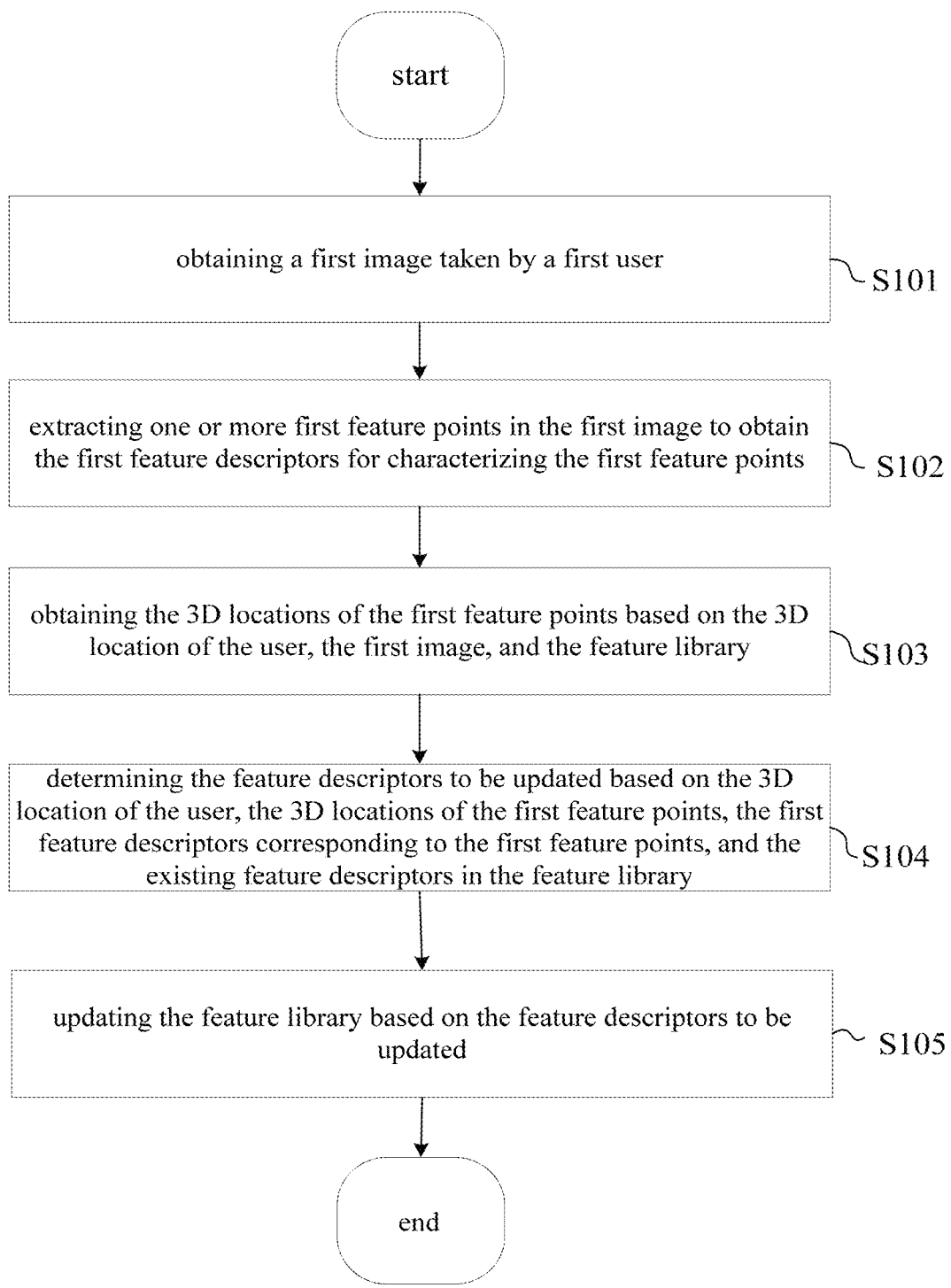
FIG. 1 is a flowchart illustrating a procedure of an information processing method in accordance with an embodiment of the disclosure.

As shown in FIG. 1, the method includes the steps of:

firstly, a first image taken by a first user is acquired at step S101. The first image as used herein may be a gray scale image, and may also be a colored RGB image.

Then, one or more first feature points in the first image are extracted to obtain the first feature descriptors for characterizing the first feature points at step S102. Normally, the points with location characteristics, such as the vertices or end points, are generally selected as the feature points. There are many feature point extraction methods, for example, a Harris angular points, a DOG extremum, and so on. The details thereof will not be described as it is not relevant to the disclosure directly. Once the feature points are determined, the next step is to extract a corresponding descriptor for each feature point, so as to distinguish the different feature points and match the same feature points. The ideal feature descriptor has to satisfy some invariance for a transformation of a scale, a rotation, and even an affinity, etc., an insensitiveness to the noise, and a good selectivity, i.e., the correlation degree between the corresponding different feature points is small, such that the different feature points can be distinguished effectively. As a most simple and easy understanding example, the feature descriptor may be a gray scale value of the feature point. One of the first feature points may corresponds to one of the first feature descriptors, and may also corresponds to a plurality of different first feature descriptors.

Next, the 3D locations of the first feature points are obtained based on the 3D location of the first user, the first image, and the feature library at step S103. The 3D locations of a first feature points under a local coordinate system may be obtained firstly based on a first image taken by a first user, if depth information is contained in the first image, i.e., the first image is an image taken by, for example, a 3D camera Kinect, and the like. Further, the 3D locations of the first feature points are transformed from the local coordinate to a global coordinate system based on the location of the first user, i.e., the location of the camera. In another aspect, for example, a plurality of 3D space location information on the first feature points has to be calculated by utilizing an image fusion-based 3D reconstruction method (a specific method is Structure From Motion (SFM), and the like), and the plurality of space information on the first feature points in the first image is calculated by any several images obtained by merging the crowdsourcing modes, if the depth information is not contained in the first image taken by the first user, that is, the first image is an image taken by, for example, a mobile phone, etc. Then the 3D locations of the first feature points are transformed from the local coordinate system to the global coordinate system based on the location of the first user. Of course, the method as exemplified above is an example merely. It is appreciated by those skilled in the art that any other methods for obtaining the plurality of space location information on the first feature points in the first image may be applied to the disclosure similarly.

In fact, the disclosure is carried out in the case where it is assumed that the space location information of the user and the space location information of the feature points on the image taken by the user is capable of being obtained, and has been obtained. In other words, the means or technology by which the space location information of the user and the space location information of the feature points are calculated is not a focus of the disclosure, as long as the space location information of the user and the space location information of the feature points may be obtained.

Then, the process proceeds into step S104. The feature descriptors to be updated are determined based on the 3D location of the first user, the 3D locations of the first feature points, the first feature descriptors corresponding to the first feature points, and the existing feature descriptors in the feature library, at step S104. That is, at step S104, it is determined which of the new obtained first feature descriptors are required to be added into the feature library and which of the feature descriptors in the original feature library are required to be deleted from the feature library. The detailed description for the step for determining the feature descriptors to be updated will be described later.

Finally, the feature library is updated based on the feature descriptors to be updated at step S105.

The feature library may be updated in accordance with the feedbacks from different users through the method flow in accordance with the embodiment of the disclosure as described above with reference to FIG. 1, such that a tedious work for the repeated mapping is avoided and a stability of localization effect is guaranteed.

The specific process for determining the feature descriptors to be updated will be described in detail hereinafter. Firstly, the specific process for determining the feature descriptors to be deleted will be described with reference to FIG. 2.

Figure 2:
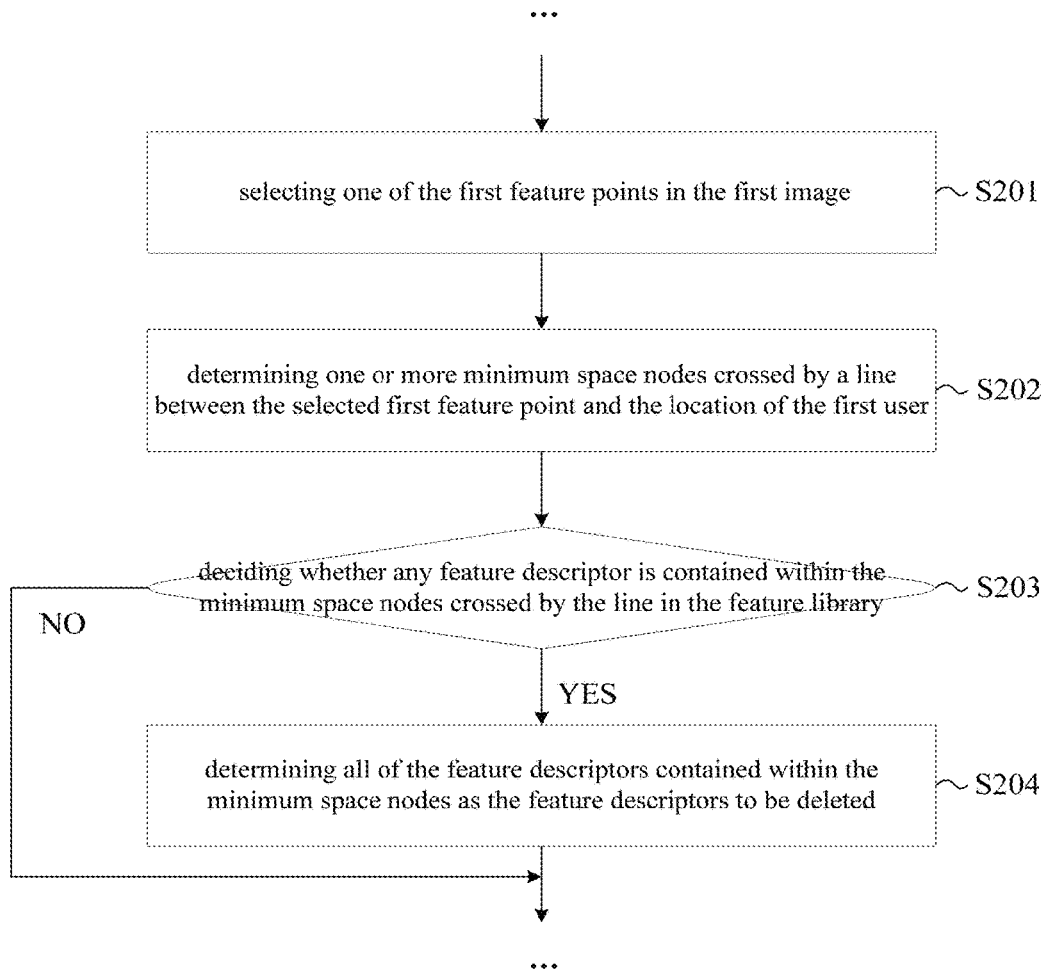
FIG. 2 is a flowchart illustrating a specific procedure for determining the features to be deleted in accordance with the embodiment of the disclosure.

Firstly, one of the first feature points in the first image is selected at step S201, as shown in FIG. 2.

Then, one or more minimum spatial nodes crossed by the line between the selected first feature points and the location of the first user are determined at step S202.

Particularly, the minimum spatial node herein is a space resolution in the certain space environment. That is, the certain space environment is divided by the minimum spatial nodes. The minimum spatial nodes herein are, of course, a certain volume space with corresponding 3D coordinates. The minimum spatial nodes may be a cube with certain volume, for example.

Figure 3:
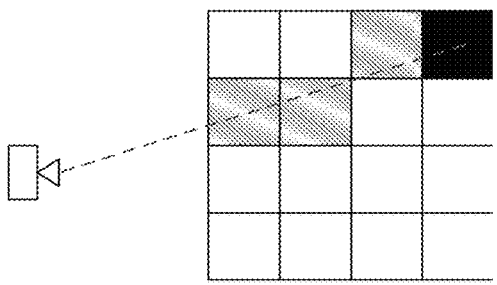
FIG. 3 is a simple schematic diagram illustrating the manner in which the features to be deleted are determined.

A simple schematic diagram of a process for determining the feature descriptors to be deleted is illustrated in FIG. 3. The location where the camera, i.e., the first user, is located and a plurality of minimum spatial nodes are illustrated in a form of plan view in FIG. 3 for sake of convenience of illustration. A principle by which the feature descriptors to be deleted are determined is that the vanished feature points in the feature library may be determined by utilizing a space distribution, since the feature library is managed by utilizing the spatial topological structure. The first feature point is selected generally as a point on a physical object which may be viewed in the first image. The minimum spatial node to which the selected first feature points belong is represented by a black grid, as shown in FIG. 3. Since the space location information on the camera, i.e., the first user, and the selected first feature points can be obtained, the line between such two space points may be determined, that is, an equation for the line between both of the space points can be determined through a space geometry knowledge. Furthermore, the minimum spatial node crossed by the line can be determined. Since the selected first feature points may be viewed in the first image, it means that there is not any occlusion object in the minimum spatial node (as shown in a shadow grid in FIG. 3) crossed by the eyesight of the user.

Returning to FIG. 2, the process proceeds into step S203. It is decided whether any feature descriptor is contained within the minimum spatial node crossed by the line determined in the step S202 above in the feature library at step S203.

The process proceeds into step S204, if the judgment is positive at step S203. All of the feature descriptors contained within the minimum spatial node are determined to be the feature descriptors to be deleted at step S204. Otherwise, the process is ended.

The steps S201-S203 as described above with reference to FIG. 2 may be performed repeatedly for many times. That is, different first feature points in the first image may be selected randomly for many times. In addition, the process performed repeatedly may be carried out in serial or in parallel.

The specific procedure for determining the features to be deleted is described in detail with reference to FIGS. 2 and 3 hereinabove. Briefly, it is proved that there is not any occlusion object at the spatial nodes crossed by the eyesight of the user if one feature point is able to be viewed in the image taken by the user, it is considered, therefore, that the feature in the crossed minimum spatial node has vanished, and the feature descriptors therein should be determined as the features to be deleted. With the elapse of time, change of a space environment for the feature library may occurs, for example, the object existed ever before may not exist any longer. Therefore, in the crowdsourcing mode, it is guaranteed that the accuracy of the feature library is not degraded with the elapse of time by determining the feature to be deleted through the feedback information from the user.

Of course, in addition to the determination of the feature descriptors to be deleted, the determination of the feature descriptors to be updated further comprises a determination of the feature descriptors to be added. A possible and simple means is to add all of the new observed feature descriptors, i.e., all of the feature descriptors of all feature points in the first image, into the feature library in entirety as the feature descriptors to be added. However, it is not an optimal implementation when taking a control over memory lost and a performance assurance into account. It is desirable that a further filtering is performed in all of the new observed feature descriptors.

Next, the specific process of the first example for determining the feature descriptors to be added will be described in detail with reference to FIG. 4.

Figure 4:
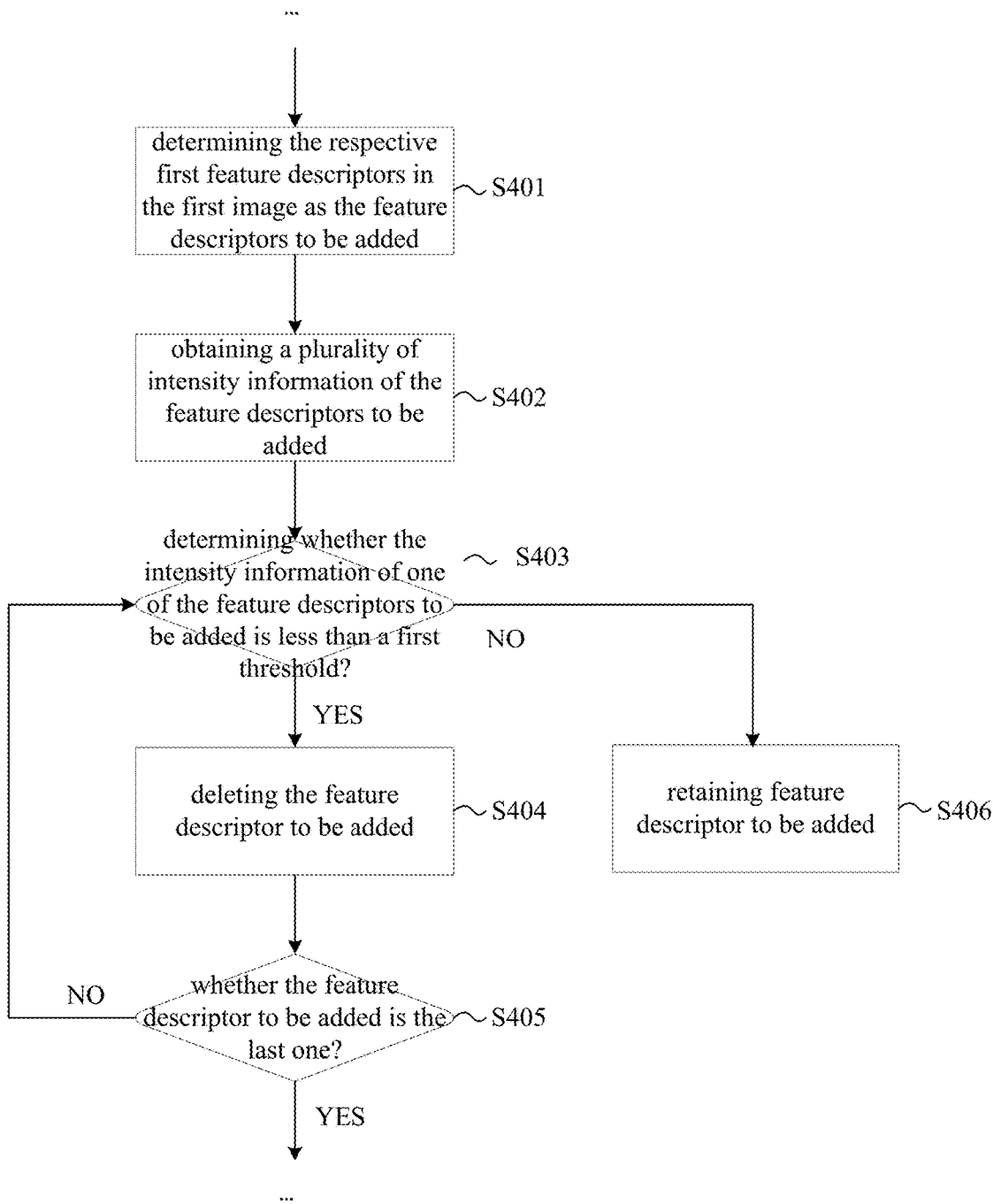
FIG. 4 is a flowchart illustrating a first example of a specific procedure for determining the features to be added in accordance with the embodiment of the disclosure.

Firstly, respective first feature descriptors in the first image are determined as the feature descriptors to be added at step S401, as shown in FIG. 4.

Then a plurality of strength information of the feature descriptors to be added is acquired at step S402. The strength information is information indicating a distinction degree between the around point and the points there around. In the case where the feature descriptor is the gray scale value, the strength information may be a difference of gray scales between the feature point and the points there around, for example.

Finally, it is determined whether the strength information of a feature descriptor to be added is less than a first threshold or not at step S403. The process proceeds into step S404, if the judgment is positive at step S403. Such feature descriptor to be added is removed at step S404. Next, the process proceeds into step S405. It is determined whether the feature descriptor to be added is the last one or not at step S405. The process is ended, if the judgment is positive at step S405. Otherwise, the process returns to step S403, and the process thereafter is repeated. On the other hand, the process proceeds into step S406, if the judgment is negative at the step S403. Such feature descriptor to be added is retained at step S406. Briefly, among the feature descriptors to be added, the feature descriptors of which the plurality of strength information is less than the first threshold are removed.

That is, the strength information of the feature may be obtained upon the feature extraction, and a robustness of the added features may be guaranteed by utilizing the information to choose the features with high feature intensities as the features to be added.

The specific process of the second example for determining the feature descriptors to be added will be described with reference to FIG. 5 hereinafter.

Figure 5:
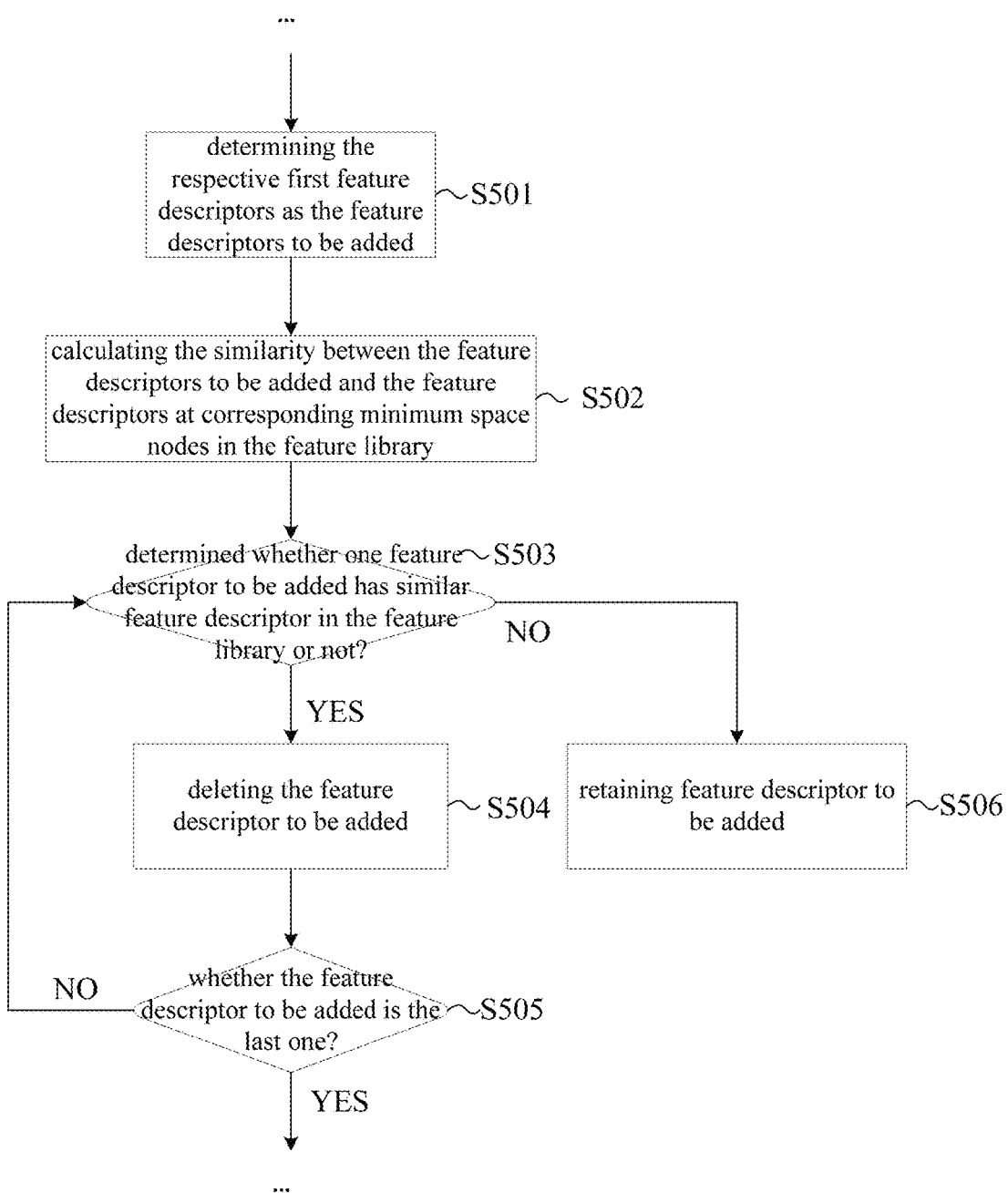
FIG. 5 is a flowchart illustrating a second example of a specific procedure for determining the features to be added in accordance with the embodiment of the disclosure.

Firstly, respective first feature descriptors in the first image are determined as the feature descriptors to be added at step S501, as shown in FIG. 5.

Then a similarity degree between the feature descriptor to be added and the feature descriptor in the feature library at corresponding minimum spatial node is calculated at step S502, wherein they are considered to be similar if the similarity degree is greater than a second threshold.

Finally, it is determined whether one feature descriptor to be added has similar feature descriptor in the feature library or not at step S503. The process proceeds into step S504, if the judgment is positive at step S503. Such feature descriptor to be added is removed at step S504. Then the process proceeds into step S505. It is determined whether the feature descriptor to be added is the last one or not at step S505. The process is ended, if the judgment is positive at step S505. Otherwise, the process returns to step S503, and the process thereafter is repeated. On the other hand, the process proceeds into step S506, if the judgment is negative at step S503. Such feature descriptor to be added is retained at step S506. Briefly, among the feature descriptors to be added, the feature descriptors which are considered similar to feature descriptors in the feature library are removed.

The features having higher similarity degree with the features contained in the corresponding locations in the feature library are removed by comparing the similarities of the current feature with the features contained in the corresponding locations in the feature library, such that it is possible to avoid an ineffective operation.

It is stated that the filter methods for the feature descriptor to be added as described above with reference to FIGS. 4 and 5 may be used individually or in combination.

Returning to FIG. 1, it is illustrated only the case where the first image is acquired by the first user and the feature library is updated based on the feedback information from the first user. In fact, however, in the crowdsourcing mode, the steps S101 to S103 may be carried out in parallel involving a plurality of different users. For example, the information processing method in accordance with the embodiment of the disclosure may further include the steps as below: acquiring a second image taken by a second user; extracting the second feature points in the second image to obtain the second feature descriptors for characterizing the second feature points; obtaining the 3D locations of the second feature points based on the location of the second user and the second image.

Moreover, the process for determining the feature descriptors to be updated may be carried out based on the feedback information from single user at the step S104. The feature descriptors to be updated may be determined based on the 3D location of the second user, the 3D locations of the second feature points, the feature descriptors corresponding to the second feature points, and the existing feature descriptors in the feature library, for example. In addition, the feature descriptors to be updated may be determined based on the 3D location of the second user, the 3D locations of the second feature points, the feature descriptors corresponding to the second feature points, and the existing feature descriptors in the feature library.

However, as a more preferred embodiment, the update of the feature library may be implemented by merging the observation results of a plurality of users, in order to maintain an accuracy of the feature library update, since the crowdsourcing mode has the uncertainty. That is, only the feature observed repeatedly for many times at the same location is updated. After the features to be updated are obtained by the previous step, some accumulation will be conducted. The update process is performed on the feature library only if the number of occurrence of the feature at the same location exceeds N.

Next, a description for the specific procedure for determining the features to be updated by merging the observation results of the plurality of users will be given. For a sake of convenient illustration, the case of N=2 is considered.

Firstly, the feature descriptors to be updated are determined initially. Particularly, the feature descriptors to be updated are determined based on the 3D location of the first user, the 3D locations of the first feature points, the feature descriptor corresponding to the first feature point, and the existing feature descriptors in the feature library, and the feature descriptors to be updated are determined based on the 3D location of the second user, the 3D locations of the second feature points, the feature descriptors corresponding to the second feature points, and the existing feature descriptors in the feature library. However, the feature descriptors to be updated as determined herein are not the final feature descriptors.

Then it is decided whether the feature descriptors to be updated at the same minimum spatial node are obtained in the first and second images or not.

A correlation degree between the feature descriptors to be updated in the first and the feature descriptors to be updated in second images at the same minimum spatial node if the judgment is positive, and the feature descriptors to be updated in the first and the feature descriptors to be updated in second images are determined as the final feature descriptors to be updated only when the correlation degree is greater than a third threshold; they are not determined as the final feature descriptors to be updated, if the judgment is negative.

When all of the feature descriptors at one minimum spatial node are determined as the feature descriptors to be deleted based on the first image, and when all of the feature descriptors at the same minimum spatial node are determined as the feature descriptors to be deleted based on the second image, the correlation degree for both of them is maximum since they are identical completely, such that they are determined as the final feature descriptors to be deleted, for example. When all of the feature descriptors at one minimum spatial node are determined as the feature descriptors to be deleted based on the first image and when all of the feature descriptors at the same minimum spatial node are not determined as the feature descriptor to be deleted based on the second image, or when all of the feature descriptors at one minimum spatial node are not determined as the feature descriptor to be deleted based on the first image and when the all of the feature descriptors at the same minimum spatial node are determined as the feature descriptors to be deleted based on the second image, they are not determined as the final feature descriptors to be deleted.

When one feature descriptor at one minimum spatial node is determined as the feature descriptor to be added based on the first image, and when another feature descriptor at the same minimum spatial node is determined as the feature descriptor to be added based on the second image, a correlation degree between the feature descriptors to be updated in the first and second images at the same minimum spatial node is calculated, for another example. If the correlation degree between two feature descriptors is greater than the third threshold (completely equal or very correlated), both of them are determined as the final feature descriptors to be added. Otherwise, an addition is not conducted. The feature descriptors of the same feature point in the image taken by the different users located at the same location and the same angle of view should be identical, for example. The feature descriptors of the same feature points in the image taken by the different users located at different locations or different angle of view presents some variation due to the location or angle of view, for example, the gray scale values may differ slightly from each other. In that case, they should be considered as the final feature descriptors to be added. Instead, they should be considered to be noise and not to be added if the difference between both of them is great.

By way of example, the issue in which the accuracy of the feature library update is degraded due to the uncertainty of the crowdsourcing mode is avoided effectively.

The information processing method in accordance with the embodiment of the disclosure is described in detail with reference to FIGS. 1 to 5 hereinabove. Next, the information processing device in accordance with the embodiment of the disclosure will be described with reference to FIG. 6.

Figure 6:
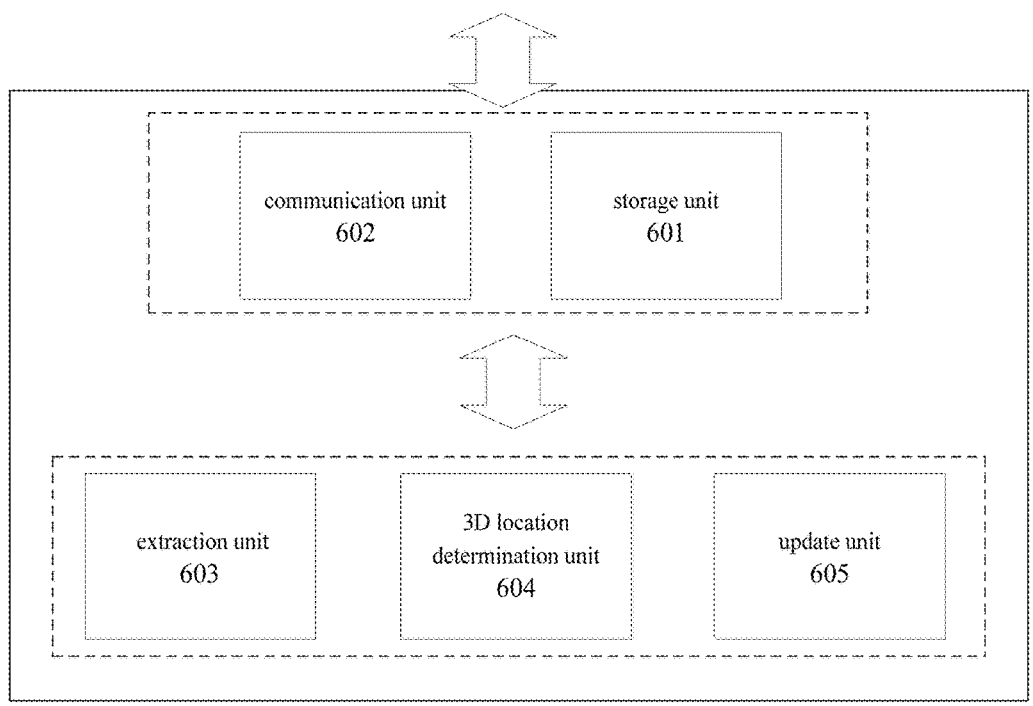
FIG. 6 is a functional block diagram illustrating a configuration of the information processing device in accordance with the embodiment of the disclosure.

The information processing device in accordance with the embodiment of the disclosure is used to create in advance a 3D map and a spatial topological structure management-based feature library for a certain environment, such that different users located in the certain environment are able to determine their locations in accordance with the images taken by themselves and the feature library. As shown in FIG. 6, the information processing device 600 comprises a storage unit 601, a communication unit 602, an extraction unit 603, a 3D location determination unit 604, and an update unit 605.

The storage unit 601 is used to store the 3D map and the feature library.

The communication unit 602 is used to acquire a first image taken by a first user.

The extraction unit 603 is used to extract one or more first feature points in the first image, and to obtain the first feature descriptors for characterizing the first feature points.

The 3D location determination unit 604 is used to obtain the 3D locations of the first feature points based on the location of the first user, the first image, and the feature library.

The update unit 605 is used to determine the feature descriptors to be updated based on the 3D location of the first user, the 3D locations of the first feature points, the first feature descriptors corresponding to the first feature points, and the existing feature descriptors in the feature library, and to updates the feature library based on the feature descriptors to be updated.

With the information processing device in accordance with the embodiment of the disclosure, the feature library may be updated in accordance with the feedbacks from different users, such that a tedious work for repeated mapping is avoided and a stability of the localization effect is guaranteed.

Figure 7:
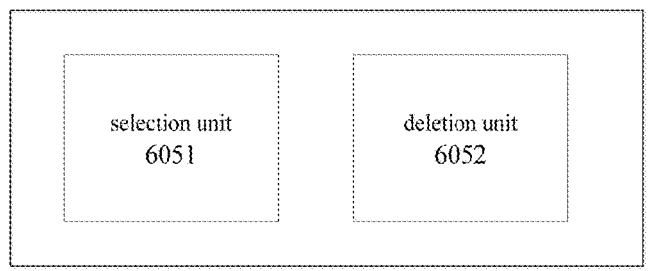
FIG. 7 is a functional block diagram illustrating a first example of an update unit in accordance with the embodiment of the disclosure.

The specific configuration of the update unit 605 will be described in detail hereinafter. Firstly, the first example of the update unit will be described with reference to FIG. 7. As described hereinabove, the determination of the feature descriptors to be updated includes a determination of the feature descriptors to be deleted, therefore, the update unit 605 may further comprise a selection unit 6051 for selecting one of the first feature points in the first image, and a deletion unit 6052 for determining one or more minimum spatial nodes crossed by the line between the first feature points and the location of the first user and for judging whether any feature descriptor in the feature library is contained within the minimum spatial node; and for determining the deletion of all of the feature descriptors contained within the minimum spatial node as the feature descriptors to be deleted if the judgment is positive, as shown in FIG. 7.

Figure 8:
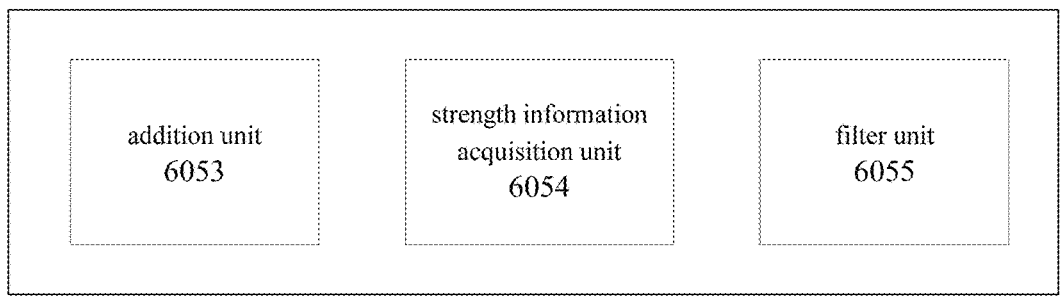
FIG. 8 is a functional block diagram illustrating a second example of the update unit in accordance with the embodiment of the disclosure.

Moreover, in addition to the determination of the feature descriptors to be deleted, the determination of the feature descriptors to be updated further includes a determination of the feature descriptors to be added. The second example of the update unit will be described with reference to FIG. 8. The update unit 605 may further comprise an addition unit 6053 for determining respective first feature descriptors in the first image as the feature descriptors to be added, as shown in FIG. 8. However, it is not an optimal implementation that the new observed feature descriptors are all added by the addition unit 6053, when taking a control over memory loss and performance assurance into account. It is desirable that a further filtering is performed in all of the new observed feature descriptors. Therefore, as a more preferred implementation, the update unit 605 may further comprise a strength information acquisition unit 6054 for acquiring a strength information of the feature descriptors to be added and a filter unit 6055 for removing the feature descriptors of which the plurality of strength information are less than the first threshold among the feature descriptors to be added.

As described hereinabove, the strength information of the feature descriptors is information characterizing the distinction degree between the feature points and the points there around. The difference of grey scales between the feature points and the points there around may be calculated, for example. The features with high feature intensities are chosen as the features to be added, such that the robustness of the added feature is guaranteed.

As another example of the filter process, a manner in which the similarities are compared may be employed. The third example of the update unit will be described with reference to FIG. 9 hereinafter. The update unit 605 may further comprise an addition unit 6053 for determining respective first feature descriptors in the first image as the feature descriptors to be added; a similarity degree calculation unit 6056 for calculating a similarity degree between the feature descriptors to be added and the feature points in the feature library at the corresponding to minimum spatial node, wherein they are considered to be similar if the similarity degree is greater than the second threshold; and a filter unit 6057 for removing the feature descriptors which are considered similar to feature descriptors in the feature library among the feature descriptors to be added, as shown in FIG. 9.

Figure 9:
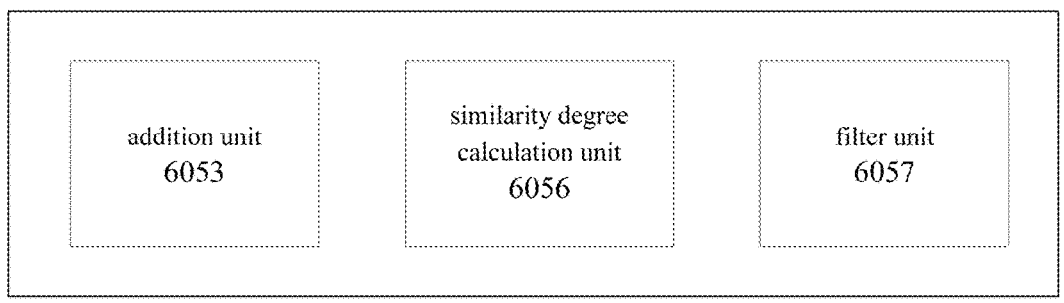
FIG. 9 is a functional block diagram illustrating a third example of the update unit in accordance with the embodiment of the disclosure.

The respective units in the update units in FIGS. 8 and 9 may be used in combination. As another possible implementation, the update unit may comprise an addition unit, a strength information acquisition unit, a similarity degree calculation unit, and a filter unit, for example.

Only a case where the first image is acquired by the first user and the feature library is updated based on the feedback information from the first user is described hereinabove. In fact, however, in the crowdsourcing mode, the communication unit 602, the extraction unit 603, the 3D location determination unit 604, and the update unit 605 may perform the process in parallel involving a plurality of different users. For example, a second image taken by a second user is acquired by the communication unit; one or more second feature points in the second image are extracted by the extraction unit to obtain the second feature descriptors for characterizing the second feature points; the 3D locations of the second feature points are obtained by the 3D location determination unit based on the location of the second user, the second image, and the feature library; the feature descriptors to be updated are determined based on the 3D location of the second user, the 3D locations of the second feature points, the second feature descriptors corresponding to the second feature points, and the existing feature descriptors in the feature library by the update unit.

The process for determining the feature descriptors to be updated may be performed based on the feedback information from single user. The feature descriptors to be updated may be determined based on the 3D location of the second user, the 3D locations of the second feature points, the feature descriptors corresponding to the second feature points, and the existing feature descriptors in the feature library by the update unit, for example. In addition, the feature descriptors to be updated may be determined based on the 3D location of the second user, the 3D locations of the second feature points, the feature descriptors corresponding to the second feature points, and the existing feature descriptors in the feature library by the update unit.

However, as a more preferred embodiment, the update of the feature library may be implemented by merging the observation results from the plurality of users by the update unit, in order to maintain the accuracy of the feature library update, since the crowdsourcing mode has the uncertainty. That is, only the feature observed repeatedly for many times at the same location is updated. After the features to be updated are obtained by the previous step, some accumulation will be conducted. The update process is performed on the feature library only if the number of occurrence at the same location exceeds N.

Next, a description for the specific procedure for determining the features to be updated by merging the observation results of the plurality of users will be given. For a sake of convenient illustration, the case of N=2 is considered.

A judgment on whether the feature descriptors to be updated at the same minimum spatial node are obtained in the first and second images is made by the update unit; a correlation degree between the feature descriptors to be updated in the first and second images at the same minimum spatial node is calculated if the judgment is positive, and the feature descriptors to be updated in the first and second images are determined as the final feature descriptors to be updated only when the correlation degree is greater than a third threshold; they are not determined as the final feature descriptors to be updated if the judgment is negative.

The detailed description for respective units in the information processing device in accordance with the embodiment of the disclosure will not be elaborated in order to avoid the redundancy, since the process performed by respective units in the information processing device corresponds completely to respective steps of the information processing method in accordance with the embodiment of the disclosure as described with reference to FIGS. 1 to 5.

The information processing method and device in accordance with the embodiment of the disclosure are described in detail with reference to FIGS. 1 to 9 heretofore. With the information processing method and device in accordance with the embodiment of the disclosure, a feature library update may be conducted and the features to be deleted and added may be determined in conjunction with a crowdsourcing mode without any repeated mapping, such that it is possible that the degraded performance of the localization database due to the variation of time, scenario, and users is prevented effectively with a minimal cost.

It is noted that the terms "comprise", "contain" or any other variations are intended to cover non-exclusive inclusion, such that the procedure, method, article, or device including a series of elements includes not only those elements but also other elements not set forth explicitly, or includes the elements inherent to such procedure, method, article, or device. The element defined by the phrase "including" does not exclude that there are other equivalent elements in the procedure, method, article, or device including the elements.

It is, finally, also stated that the series of processes above include not only the process performed in time series at the order as described herein but also the process performed in parallel or respectively instead of a time order.

From the description of the implementations above, the skillful in the art may appreciate clearly that the disclosure may be implemented by means of the software plus the necessary hardware platform, and may be embodied by the software entirely. Based on such appreciation, all or part of the contribution to the related art made by the solution of the disclosure may be embodied by a form of a software product which may be stored in a storage medium, such as a ROM/RAM, a magnetic disk, an optical disk, and so on, including several instructions having a computer device, which may be a personal computer, a server, or a network device, etc., execute the method of respective embodiments or some parts of the embodiments of the disclosure.

A detailed introduction is made on the disclosure hereinabove, and the principle and the implementation of the disclosure are set forth by using the specific examples in the context, and the illustration of the embodiments above is used to facilitate an understanding of the method of the disclosure and the core concept merely; meanwhile, as to those skilled in the art, there are variations on the specific implementation and the application extent in accordance with the concept of the disclosure, and in summary, the content of the specification should not construed to be any limitation to the disclosure.

The invention claimed is:

1. An information processing method applied to an information processing device in which a 3D map and a spatial topological structure management-based feature library created in advance for a certain environment is contained, and different users in the certain environment are able to determine their location in accordance with images taken by themselves and the feature library, the method comprising:
   acquiring a first image taken by a first user;
   extracting one or more first feature points in the first image to obtain first feature descriptors for characterizing the first feature points;
   obtaining 3D locations of the first feature points based on a 3D location of the first user, the first image, and the feature library;
   determining feature descriptors to be updated based on the 3D location of the first user, the 3D locations of the first feature points, the first feature descriptors corresponding to the first feature points, and existing feature descriptors in the feature library; and
   updating the feature library based on the feature descriptors to be updated,
   wherein the step of determining feature descriptors to be updated comprises:
   selecting one of the first feature points in the first image;
   determining a minimum spatial node crossed by a line between the selected first feature point and the location of the first user;
   judging whether any feature descriptors of the feature library are contained within the minimum spatial node; and
   determining all of the feature descriptors contained within the minimum spatial node as feature descriptors to be deleted if the judgement is positive, wherein the minimum spatial node is a space resolution in the certain space environment, and the certain space environment is divided by the minimum spatial node,
   wherein the step of determining feature descriptors to be updated further comprises:
   determining respective first feature descriptors in the first image as feature descriptors to be added;
   acquiring a plurality of strength information of the feature descriptors to be added; and
   among the feature descriptors to be added, removing feature descriptors of which the plurality of strength information are less than a first threshold; and
   wherein the step of determining feature descriptors to be updated further comprises:
   determining respective first feature descriptors in the first image as feature descriptors to be added;
   calculating a similarity degree between the feature descriptors to be added and the feature descriptors in the feature library at the corresponding minimum spatial node, wherein they are considered to be similar if the similarity degree greater than a second threshold; and
   among the feature descriptors to be added, removing feature descriptors which are considered similar to the feature descriptors in the feature library.

2. The information processing method of claim 1, wherein the step of obtaining 3D locations of the first feature points based on 3D location of the first user, the first image, and the feature library further comprises:
   obtaining 3D locations of the first feature points under a local coordinate system based on the first image;
   transforming the 3D locations of the first feature points from the local coordinate to a global coordinate system based on the 3D location of the first user.

3. The information processing method of claim 1, further comprises:
   acquiring a second image taken by a second user;
   extracting second feature points in the second image to obtain second feature descriptors for characterizing the second feature points;
   obtaining a 3D location of the second feature points based on a location of the second user and the second image;
   determining feature descriptors to be updated based on a 3D location of the second user, the 3D locations of the second feature points, the feature descriptors corresponding to the second feature points, and existing feature descriptors in the feature library;

judging whether the feature descriptors to be updated at the same minimum spatial node are obtained in the first and second images;

calculating a correlation degree between the feature descriptors to be updated in the first and second images at the same minimum spatial node if the judgment is positive, and determining the feature descriptors to be updated in the first and second images as the final feature descriptors to be updated only when the correlation degree is greater than a third threshold; and determining them not as final feature descriptors to be updated if the judgment is negative.

4. An information processing device for creating in advance a 3D map and a spatial topological structure management-based feature library for a certain environment, such that different users in the certain environment are able to determine their locations in accordance with image taken by themselves and the feature library, the device comprising:
a storage for storing the 3D map and the feature library;
a processor
wherein the storage stores instructions that can be executed by the processor to:
acquire a first image taken by a first user;
extract one or more first feature points in the first image to obtain first feature descriptors for characterizing the first feature points;
obtain 3D locations of the first feature points based on location of the first user, the first image, and the feature library; and
determine feature descriptors to be updated based on 3D location of the first user, the 3D locations of the first feature points, the first feature descriptors corresponding to the first feature points, and existing feature descriptors in the feature library, and for updating the feature library based on the feature descriptors to be updated,
wherein the step of determining feature descriptors to be updated comprises:
selecting one of the first feature points in the first image; and
determining a minimum spatial node crossed by the line between the first feature points and the location of the first user, and for judging whether any feature descriptor in the feature library is contained within the minimum spatial nodes;
determining all of the feature descriptors contained within the minimum spatial node as feature descriptors to be deleted if the judgement is positive, and wherein the minimum spatial node is a space resolution in the certain space environment, and the certain space environment is divided by the minimum spatial node,
wherein the step of determining feature descriptors to be updated comprises:

determining respective first feature descriptors in the first image as the feature descriptors to be added;
acquiring a plurality of strength information of feature descriptors to be added; and
removing the feature descriptors of which the plurality of the strength information are less than a first threshold among the feature descriptors to be added; and
wherein the step of determining feature descriptors to be updated comprises:
determining respective first feature descriptors in the first image as feature descriptors to be added:
calculating a similarity degree between the feature descriptor to be added and a feature point in the feature library at the corresponding minimum spatial node, wherein they are considered to be similar if the similarity degree is greater than a second threshold; and
removing the feature descriptors with the similar feature descriptors in the feature library.

5. The information processing device of claim 4, wherein the step of obtaining 3D locations of the first feature points based on 3D location of the first user, the first image, and the feature library further comprises:
obtaining 3D locations of the first feature points under a local coordinate system based on the first image;
transforming the 3D locations of the first feature points from the local coordinate to a global coordinate system based on the 3D location of the first user.

6. The information processing device of claim 4, wherein the storage stores instructions which can be executed by the processor to further achieve the following steps:
acquire a second image taken by a second user;
extract one or more second feature points in the second image to obtain second feature descriptors for characterizing the second feature points;
obtain 3D locations of the second feature points based on location of the second user, the second image, and the feature library;
determine feature descriptors to be updated based on the 3D location of the second user, the 3D locations of the second feature points, the second feature descriptors corresponding to the second feature points, and existing feature descriptors in the feature library, and
make a judgment on whether the feature descriptors to be updated at the same minimum spatial node are obtained in the first and second images;
calculate a correlation degree between the feature descriptors to be updated in the first and second images at the same minimum spatial node if the judgment is positive, and determine the feature descriptors to be updated in the first and second images as the final feature descriptors to be updated only when the correlation degree is greater than a third threshold; and
determine they are not final feature descriptors to be updated if the judgment is negative.

* * * * *